United States Patent [19]

Furuichi

[11] 4,043,666

[45] Aug. 23, 1977

[54] ORIGINAL SHEET CARRYING AND ILLUMINATING DEVICE FOR USE IN ELECTROPHOTOGRAPHIC COPYING MACHINE

[75] Inventor: Masayoshi Furuichi, Tokyo, Japan

[73] Assignee: Kabushiki-Kaisha KIP, Tokyo, Japan

[21] Appl. No.: 670,073

[22] Filed: Mar. 24, 1976

[30] Foreign Application Priority Data

Apr. 1, 1975 Japan .................................. 50-40156

[51] Int. Cl.$^2$ ........................ G03B 27/70; G03B 27/62

[52] U.S. Cl. .......................................... 355/76; 355/51

[58] Field of Search ........................ 355/73, 76, 68, 11, 355/18, 8, 50, 51, 57, 60, 66

[56] References Cited

U.S. PATENT DOCUMENTS

| | | | |
|---|---|---|---|
| 2,930,284 | 3/1960 | Limberger | 355/51 |
| 3,689,143 | 9/1972 | Case et al. | 355/57 X |
| 3,689,150 | 9/1972 | Nothmann et al. | 355/76 X |
| 3,709,603 | 1/1973 | Furuichi | 355/60 |
| 3,792,924 | 2/1974 | Matsuda et al. | 355/11 X |
| 3,947,112 | 3/1976 | Hahn et al. | 355/68 |

*Primary Examiner*—Donald A. Griffin
*Attorney, Agent, or Firm*—Cushman, Darby & Cushman

[57] ABSTRACT

An original sheet carrying and illuminating device for use in an electrophotographic copying machine and which is provided with first and second carrying means driven at a predetermined speed to carry an original sheet, the portion of the second carrying means participating in carrying the sheet being shorter than the first carrying means, the second carrying means being provided with means for pneumatically attracting the sheet onto the second carrying means, and there being further provided first and second lighting means selectively energized to illuminate either of the surfaces of the sheet.

5 Claims, 4 Drawing Figures

ORIGINAL SHEET CARRYING AND ILLUMINATING DEVICE FOR USE IN ELECTROPHOTOGRAPHIC COPYING MACHINE

BACKGROUND OF THE INVENTION

This invention relates to a device for use in an electrophotographic copying machine and which carries and illuminates an original sheet on which an original image to be copied is provided.

In various types of conventional electrophotographic copying machines, the size of the original sheets to be copied is limited to A-2 (420mm × 594mm) at the largest. It has recently been required in various industrial fields that larger copying machines are to be provided to copy larger sizes of the original sheets, such as the sizes of A-1 (594mm × 841mm) and A-0 (841mm × 1189mm). However, there have been many difficulties in manufacturing such a larger copying machine having a good copying ability for such larger sizes of the original sheets. One of these difficulties results from the original sheet carrying and illuminating device provided in such a larger copying machine.

For various reasons, it is preferable that such an original sheet carrying and illuminating device is arranged to move the original sheet across an associated optical system for projecting the original image to a photosensitive plate of the copying machine on which a latent image is formed. In such a case, however, it is necessary to stably move the sheet at a predetermined speed, but conventional devices of this kind cannot prevent lateral displacement of the larger original sheet as well as its variation in its longitudinal movement, and also has a difficulty in carrying such a larger sheet closely on a supporting plate.

It is further required that the larger copying machine can be used to make copies from transparent, translucent or opaque original sheets, because such a larger copying machine has to be available for transparent or translucent sheets of design drawings ordinarily used in many factories, as well as opaque sheets. It is often desired to make a copy including information described or printed on the back surface of the transparent or translucent original sheet, such as a tracing paper, as well as including information described on the front surface thereof. However, conventional original sheet carrying and illuminating devices are not suitable for such a purpose.

SUMMARY OF THE INVENTION

It is an object of the present invention to provide a device for use in an electrophotographic copying machine and which carries and illuminates a relatively large size of the original sheet on which an original image to be copied is provided.

It is a further object of the present invention to provide such a device available for carrying and illuminating either of transparent, translucent and opaque original sheets.

It is a still further object of the present invention to provide such a device usable for various sizes of the original sheets.

According to the present invention, an original sheet carrying and illuminating device for use in an electrophotographic copying machine comprises original sheet carrying means for carrying an original sheet within the device and light source means for illuminating said original sheet, the improvement wherein said original sheet carrying means include a first carrying means having a clipping means for clipping the original sheet and carrying the latter at a predetermined speed, a second carrying means for carrying said sheet at the same speed as that of said first carrying means and a portion of said second carrying means participating in carrying said sheet being shorter than said first carrying means, said second carrying means being provided with sheet attracting means for pneumatically attracting said sheet onto said second carrying means, and said light source means including a first lighting means selectively energized to project light onto one surface of said original sheet and a second lighting means energized alternatively to said first lighting means to project light onto the other surface of said original sheet.

BRIEF DESCRIPTON OF THE DRAWINGS

DESCRIPTION OF THE PREFERRED EMBODIMENTS

Figure 1:
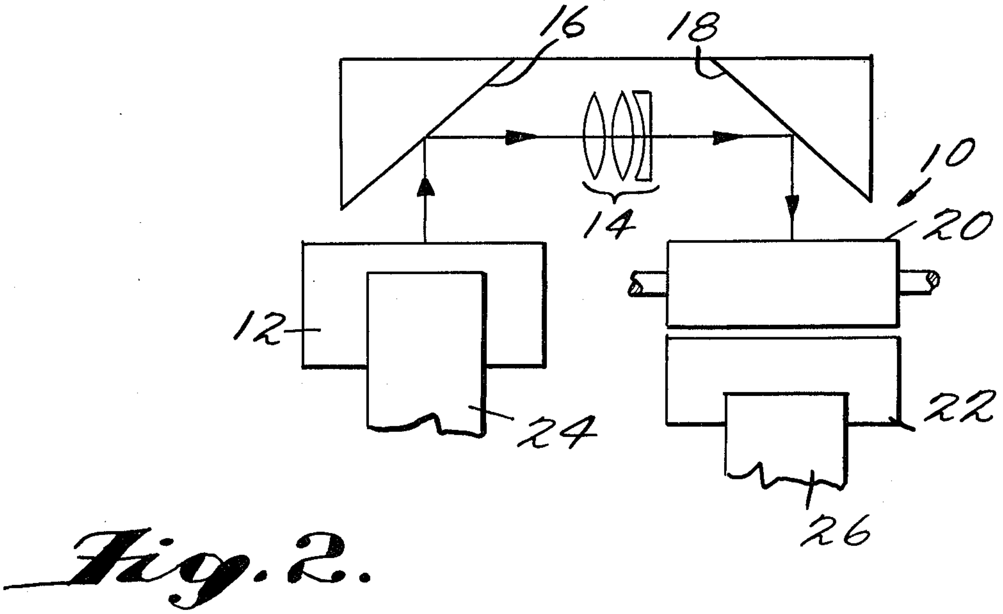
FIG. 1 is a diagrammatic front elevation of an electrophotographic copying machine incorporated with an original sheet carrying and illuminating device according to the present invention.

FIG. 1 diagrammatically shows the general construction of an electrophotographic copying machine generally indicated by 10 and which comprises original sheet carrying and illuminating device 12 arranged in accordance with the present invention, an optical system including lens 14 and reflector mirrors 16 and 18, a rotatable photosensitive drum 20 on which a latent image is formed in use, and a receptor sheet feeding device 22. The optical system may be constructed in accordance with U.S. Pat. No. 3,709,603 to the applicant of the present application, and the latent image may also be formed on the photosensitive drum 20 by the apparatus disclosed in said U.S. patent.

In use, an original sheet 24 on which an original image or images to be copied are illustrated is attached to and then carried by the device 12 as will be described in detail herein later. At the same time, a receptor sheet 26 is also fed by the device 22 to the photosensitive drum 20 synchronously with the movement of the sheet 24. During the movement of the sheet 24 through the device 12, the sheet 24 is illuminated by light from a light source of the device 12 as will be described in detail herein later, so that the original image of the sheet 24 is projected to the surface of the photosensitive drum 20 through the mirror 16, the lens 14 and the mirror 18 to form an electrostatic latent image on the drum 20. The latent image is then developed by a suitable developing device (not shown) and the developed image is transferred to the receptor sheet 26 by a suitable transfer device (also not shown) and then fixed to the sheet by a suitable fixing device (not shown).

Figure 2:
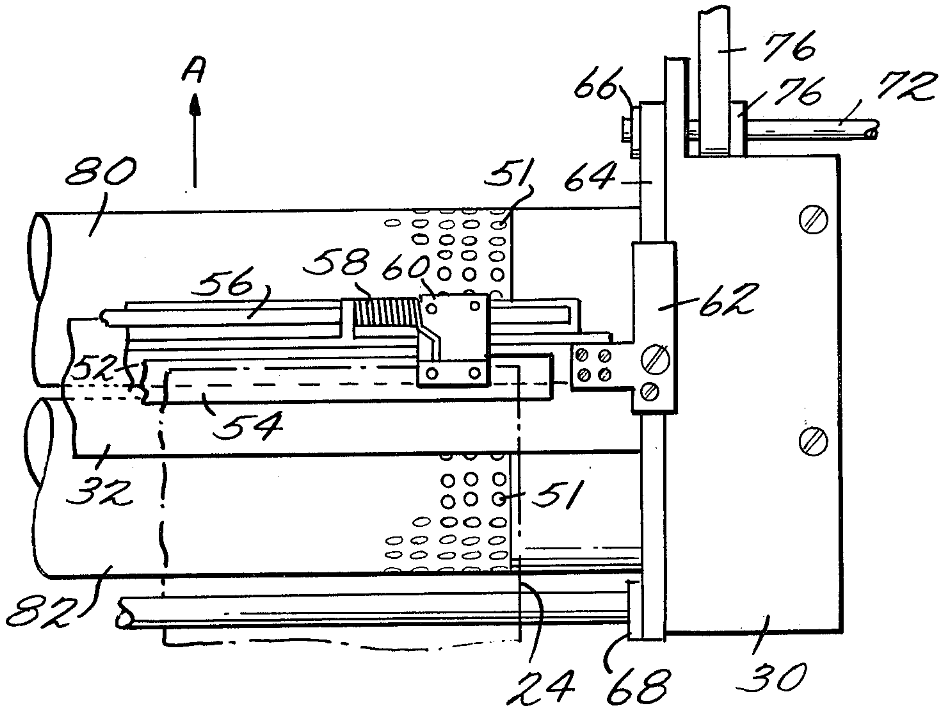
FIG. 2 is a plan view partly broken away of an embodiment of the device of the present invention.
Figure 3:
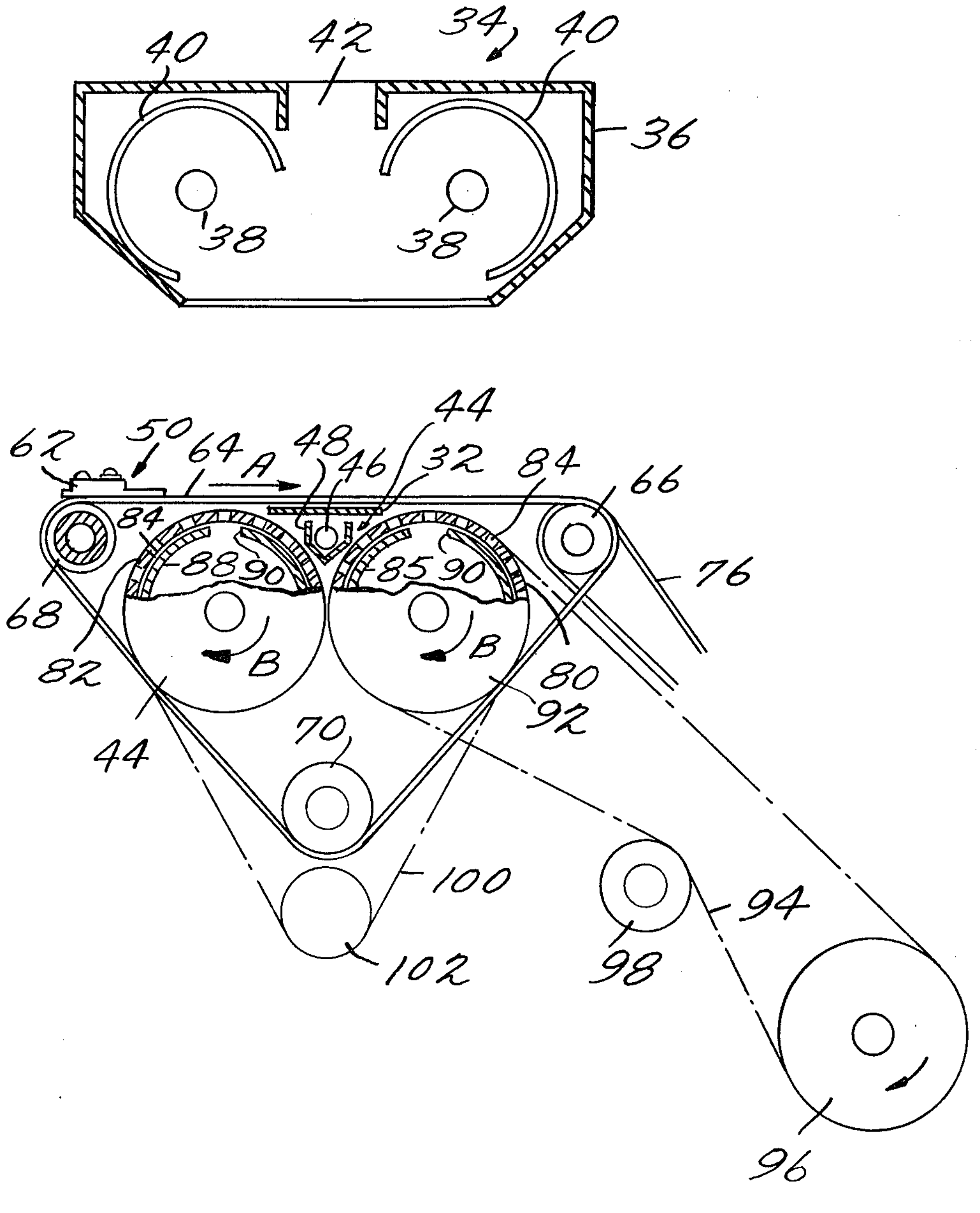
FIG. 3 is a side sectional view of the embodiment of the device shown in FIG. 2.

Referring next to FIGS. 2 and 3, the original sheet carrying and illuminating device 12 according to the present invention is provided with a pair of fixed base plates 30 on its opposite ends, respectively, only one of the plates 30 being shown in FIG. 2. Fixed to the plates 30 is laterally extending elongated plate 32 which is made of a transparent material, such as glass. The plate 32 has a smooth flat surface and a sufficient lateral length to permit the maximum size of the original sheet 24 to move thereon and in this embodiment the plate has a lateral length of permitting the A-0 size of the sheet to move thereon.

Also provided above and spaced away from the plate 32 is a first light source device 34 which comprises a frame 36 fixed to a stationary portion of the device 12, a pair of spaced lighting elements 38, such as halogen or iodine lamps, a pair of reflectors 40, each of which serves to reflect light from the respective elements 38, and the arrangement being such that when the original sheet 24 moves in the device 12 the portion of the sheet 24 moving on the plate 32 is uniformly illuminated by light from the elements 38 so that the image on the said portion of the sheet 24 is projected through a slit-like opening 42 formed in the frame 36, and further through the optical system to the photosensitive drum 20.

There is further provided a second light source device 44 below the transparent plate 32, the device 44 including a light element 46 which is of a similar type to that of the lamps 38 and extends in substantially parallel with the plate 32, and a reflector 48 for reflecting light from the lamp 46 to the plate 32. When the original sheet 24 to be fed is of a transparent or translucent type, such as a tracing paper, the light element 46 of the second device 44 is energized to illuminate the sheet from its lower surface so that the original image or images provided on one or both surfaces of the sheet are projected to the drum 20 through the opening 42 and the optical system.

It will be understood that the first and second light source devices 34 and 44 are controlled to be selectively energized by suitable electric control means, such as a change-over switch (not shown), in accordance with the type of the original sheet, i.e. the sheet being transparent, translucent or opaque.

The original sheet 24 is positively fed over the plate 32 by first and second carrying mechanisms. The first carrying mechanism includes a sheet clipping device 50 having a pair of clipping members 52, 54 between which the leading end of the original sheet is clipped as described below. The member 52 is provided with a rod 56 on which a coil spring 58 and a connecting member 60 are rotatably mounted adjacent to one end of clipping members 52, 54. The member 60 is secured at its one end to the member 54, and the ends of the spring 58 are engaged with the members 52 and 54, respectively, so that the member 54 is resiliently urged against the member 52. A similar spring and a similar connecting member are also provided adjacent to the other end of the members 52, 54 to ensure that the leading end of the original sheet is firmly clipped by the members 52, 54.

In order easily to make such clipping operation, the device 12 of this embodiment is provided with a lever mechanism (not shown) including a lever which is positioned so that one end thereof can be engaged with an extension of the clipping member 54, only when the sheet clipping device 50 is in its initial or rest position shown in FIG. 3. The lever is operated by an electric solenoid controlled by a foot switch, and when it is desired to clip the original sheet between the clipping members 52 and 54, the operator operates the foot switch by his foot to energize the solenoid so that the lever is pivotally moved to urge the member 54 against the action of the springs 58, and thus the operator can easily insert and set the leading end of the sheet between the members. Thereafter, the operator removes his foot from the switch to de-energize the solenoid so that the lever is returned to its rest position to be disengaged from the member 54 thereby clipping the sheet by the members 52, 54 under the action of the springs 58.

The opposite ends of the member 52 are secured by a pair of connector members 62 to a pair of endless belts 64, respectively, one of each of the members 62 and belts 64 being seen in the drawings. Each of the belts 64 is engaged with pulleys 66, 68 and 70, and the upper run of each of the belts 64 is positioned above the level of the transparent plate 32, but closely spaced apart therefrom. The pulleys 66 for the respective belts 64 are fixed to shafts 72, respectively, which are rotatably supported by the respective plates 30. Each of the shafts 72 is also provided with a further pulley 74 which is driven at a predetermined speed through an endless belt 76 by driving means, such as an electric motor, the arrangement being such that when the driving means are energized the belts 64 are moved in the direction of an arrow A at the predetermined speed and synchronously with rotation of the photosensitive drum 20. In this embodiment, the pulleys 66, 68 and 70 are so positioned that the length of the respective belts 64 is smaller than the longitudinal length of the minimum size of the original sheet to be used with the device 12.

The second carrying mechanism comprises a pair of cylindrical sleeves 80, 82 which extend between the plates 30 in substantially parallel relationship with the plate 32 and are rotatably supported by the frame of the device 12 so that the top portions of the respective sleeves are positioned at the level of the upper surface of the transparent plate 32 and the distance between the axes of the sleeves 80, 82 is smaller than the distance between the axes of the pulleys 66, 68. The cylindrical wall of each of the sleeves 80, 82 is formed with a plurality of relatively small apertures 84. Coaxially provided respectively within the sleeves are stationary hollow cylinders 85, 88, each of which is formed with an axially extending slot 90 which is upwardly open. The interior of each of the cylinders 85, 88 is connected through suitable conduit means (not shown) to a suitable air evacuating device (also not shown) so that in use, air is sucked from the exterior of the sleeves into the respective cylinders through the slots 90 thereof and the apertures 84 of the sleeves brought into registration with the slots, thereby pneumatically attracting the original sheet onto the top portions of the sleeves.

Secured to the sleeve 80 is a pulley 92 which is connected by an endless belt 94 to a pulley 96 driven by the driving means of the device 12, and the belt 94 is tensioned by a pulley 98. With this arrangement, in use, the sleeve 80 is rotated in the direction of an arrow *B* with its peripheral speed substantially equal to the speed of the belts 64. The sleeves 80, 82 are provided with pulleys (not shown), respectively, and these pulleys are engaged with an endless belt 100 which is tensioned by a pulley 102. With this arrangement, the sleeve 82 is also rotated in the same direction as that of the sleeve 80 at the same speed as that of the latter.

In use, the leading end of the original sheet is clipped between the members 52 and 54 of the sheet clipping device 50 as described heretofore. When the original sheet is opaque, the switch in the electric circuit for the first and second light source devices 34 and 44 is set to energize the light elements 38 and de-energize the light element 46, and when the original sheet is transparent or translucent the switch is set to energize the light element 46 and de-energize the light elements 38. The operation switch of the copying machine is then operated to energize the driving means so that the belts 64 are moved in the direction of the arrow A thereby moving the device 50 from its rest position. At the same time, the sleeves 80, 82 are rotated in the direction of the arrows B and the air evacuating device is also operated. When the original sheet clipped by the device 50 passes over the sleeves 80, 82, the sheet is pneumatically attracted onto the top portions thereof and thus moves on the transparent plate 32 in closely sliding contact with the latter. In so doing, the original image provided on the original sheet is projected by light from the first or second light source device 34 or 44, through the opening 42 and the optical system to the photosensitive drum 20 which is rotating synchronously with the movement of the original sheet.

When the belt 64 further moves and the sleeves 80, 82 further rotate, the device 50 is turned by the pulleys 66 and 70 to move towards the pulley 68. When the device 50 moves near the pulley 68, suitable sensing means are operated to de-energize the driving means for the belts 64 thereby stopping the movement of the latter. However, the driving means for the sleeves 80, 82 are still energized to rotate the sleeves thereby advancing the original sheet attracted onto the sleeves. In this manner, after the movement of the belts 64 has ceased the portion of the original sheet which has not passed over the plate 32 is continuously moved by further rotation of the sleeves 80, 82, and the sheet is gradually suspended downwardly of the lower run of the belts 64. When the trailing end of the original sheet has passed over the plate 32, this is sensed by further sensing means to energize the driving means for moving the belts 64 thereby again advancing the device 50. When the device 50 moves to its initial position shown in FIG. 3, the last-mentioned driving means are de-energized to stop the device 50 at that position.

Figure 4:
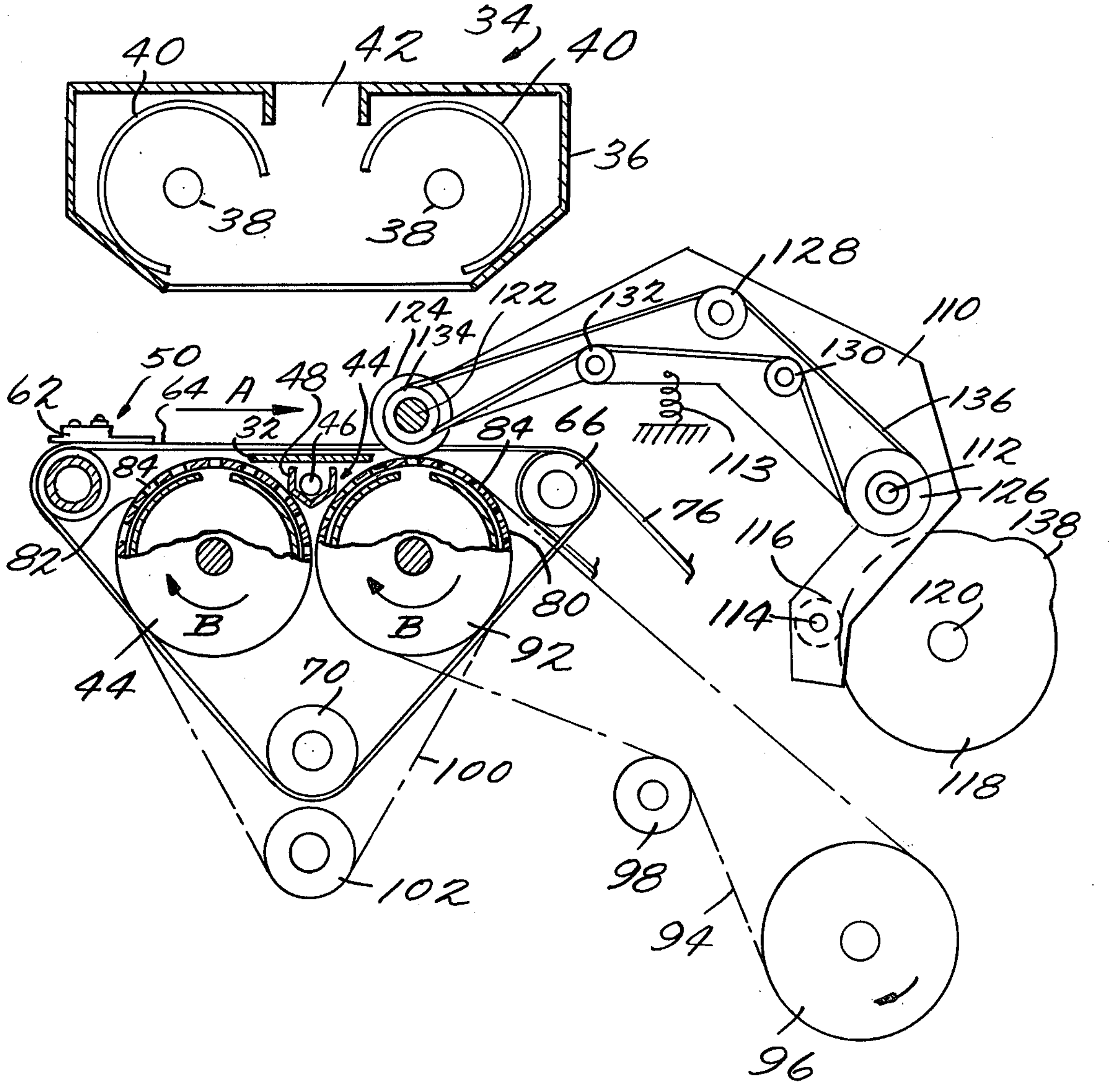
FIG. 4 is a side sectional view of another embodiment of the device according to the present invention.

An alternative embodiment of the present invention is shown in FIG. 4, and parts thereof similar to those of the first embodiment are indicated by the same reference numerals and constructed and operated as described heretofore.

In the embodiment of FIG. 4, there is further provided at least a pair of bell crank levers 110 which are pivotally supported by a shaft 112 in spaced relationship with one another and are biased by springs 113 in an anticlockwise direction as seen in FIG. 4, the shaft 112 extending substantially parallel with the axis of the sleeve 80 and rotatably supported by the fixed frame of the device 12. Secured to the levers 110 at one end is a rod 114 which is provided at its intermediate portion with a rotatable roller 116. The roller 116 abuts against the cam surface of a disc cam 118 having a shaft 120 which is rotatably supported by the fixed frame of the device 12. A further shaft 122 extends through the other ends of the levers 110 and is rotatably supported by the latter. The shaft 122 has fixed thereto a plurality of resilient rollers 124 which are made of rubber, for example.

One of the levers 110 is provided on its one side with a pulley 126 which is fixed to the shaft 112. The lever 110 is also provided on that side with pulleys 128, 130 and 132 and is further provided at the other end with a pulley 134 fixed to the shaft 122, and an endless belt 136 is engaged with the pulleys 126, 128, 130, 132 and 134. In use, the shaft 112 is driven by suitable driving means such that the rollers 124 are rotated in the anti-clockwise direction as seen in FIG. 4 at the same peripheral speed as that of the sleeve 80.

The shaft 120 and thus the cam 118 are, in use, rotated in timed relationship with the movement of the belts 64 such that when the clipping device 50 comes near the rollers 124 the roller 116 rides on a cam projection 138 thereby pivotally moving the levers 110 in a clockwise direction against the action of the springs 113 to separate the rollers 124 from the sleeve 80 for permitting the passage of the device 50 between the sleeve 80 and the rollers 124, and immediately when the device 50 has passed therebetween the roller 116 descends from the projection 138 to move the levers 110 in the anti-clockwise direction thereby causing the rollers 124 together with the sleeve 80 to pinch the original sheet clipped in the trailing end of the device 50. With this arrangement, the original sheet is more smoothly carried without causing slipping movement between it and the sleeves to ensure that no distortion is caused in the light image projected to the photosensitive drum.

It will be understood that the device of the present invention is advantageous in that by the provision of the first and second carrying mechanisms the device can be made smaller in size than conventional devices of this kind and the original sheet is smoothly fed to minimize the occurence of distortion in the light image projected therefrom, in that by the provision of the first and second light source devices a good light image can be projected from transparent, translucent or opaque original sheets.

What is claimed is:

1. In an electrophotographic copying device having means for carrying an original sheet and light source means for illuminating said sheet, the original sheet carrying means comprising:

a first movable carrying means having clipping means for grasping the sheet at an initial position and transporting the sheet past a location at which the sheet is subjected to illumination from the light source means, said first carrying means transporting the sheet a distance which is less than the length of the sheet before moving in a return path towards said initial position during which movement said first carrying means is stopped; and a second movable carrying means for pneumatically attracting and supporting said sheet as it passes said location, the portion of said second carrying means supporting the sheet being shorter than said distance along which the sheet is transported by the first carrying means.

2. A device according to claim 1, wherein said first carrying means comprises a pair of spaced belts extending through said location and moving at a predetermined speed; and wherein said clipping means comprises a first clipping member secured to said belts, a second clipping member pivotally mounted on said first clipping member, and resilient means provided between said first and second clipping members to urge said second clipping member against said first clipping member thereby holding a leading edge of said original sheet between said first and second clipping members.

3. A device according to claim 1 wherein said second carrying means comprises:

a pair of rotatable sleeves and a stationary cylinder positioned coaxially within each of said sleeves, a plurality of apertures formed in each of said sleeves, and an axially extending slot formed in each of the cylinders whereby when air is evacuated from said cylinders, registration of sleeve apertures with said slots permits pneumatic attraction of the sheet to said sleeves.

4. A device according to claim 1, further comprising: means operatively related to said second carrying means to urge the original sheet thereagainst, said engageable means also being driven at a speed correponding to that of the second carryin means.

5. A device according to claim 4, wherein said means engageable with the second carrying means comprises:

at least one pivotally mounted spring-loaded lever, a roller at one end of the lever normally urged by the spring towards the second carrying means and driven at a speed corresponding to that of the second carrying means, a cam operatively related to the opposite end of said lever, said cam being driven in timed relationship with the movement of said first carrying means to pivotally move the lever against the force of the spring to separate the roller from the second carrying means thereby allowing the clipping means to pass between the roller and the second carrying means.

* * * * *